United States Patent
Meador

(10) Patent No.: US 6,948,421 B2
(45) Date of Patent: *Sep. 27, 2005

(54) BREWING APPARATUS

(75) Inventor: Keith Joseph Meador, 1900 Cresson, South Lake, TX (US) 76092

(73) Assignee: Keith Joseph Meador, Southlake, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/601,990

(22) Filed: Jun. 24, 2003

(65) Prior Publication Data

US 2004/0216616 A1 Nov. 4, 2004

Related U.S. Application Data

(63) Continuation-in-part of application No. 10/084,127, filed on Feb. 28, 2002, now Pat. No. 6,619,188.

(51) Int. Cl.[7] .................................................. A47J 31/00
(52) U.S. Cl. ............................ 99/300; 99/279; 99/323.3
(58) Field of Search .......................... 99/279, 295, 300, 99/323.3; 222/129.1, 129.3, 146.1, 146.2

(56) References Cited

U.S. PATENT DOCUMENTS

| 3,589,272 | A | * | 6/1971 | Bouladon et al. ............. 99/295 |
| 4,165,681 | A | * | 8/1979 | Belinkoff ...................... 99/280 |
| 4,167,899 | A | | 9/1979 | McCormick |
| 4,452,130 | A | * | 6/1984 | Klein ........................... 99/307 |
| 4,508,023 | A | * | 4/1985 | Naya et al. .................... 99/279 |
| 4,662,271 | A | * | 5/1987 | Woltermann ................. 99/299 |
| 6,202,541 | B1 | | 3/2001 | Cai |
| 6,619,188 | B1 | * | 9/2003 | Meador ....................... 99/295 |

FOREIGN PATENT DOCUMENTS

| EP | 0 344 541 | 12/1989 |
| EP | 1 243 210 | 9/2002 |

* cited by examiner

Primary Examiner—Reginald L. Alexander
(74) Attorney, Agent, or Firm—Harness, Dickey & Pierce, P.L.C.

(57) ABSTRACT

A beverage brewing apparatus having a two chamber disposable cartridge that has fresh water in one chamber and brew ingredients in the other chamber. The cartridge fits into a cavity formed in a housing that includes a water heating system and expansion chamber. The water heating system is energized when the disposable cartage is nested in the housing. The system produces a pre-measured volume of a brewed beverage or hot liquid automatically.

5 Claims, 3 Drawing Sheets

BREWING APPARATUS

CROSS-REFERENCE TO RELATED APPLICATION

This application is a continuation-in-part of U.S. patent application Ser. No. 10/084,127 filed on Feb. 28, 2002 (now U.S. Pat. No. 6,619,188, issued Sept. 16, 2003).

TECHNICAL FIELD

This invention relates to brewing apparatus and more particularly to brewing apparatus having a pre-package unbrewed drink ingredients or bottled water.

BACKGROUND OF THE INVENTION

Reference Application Ser. No. 10/084,127, File date Feb. 28, 2002, Inventor Keith J Meador, which was allowed on Apr. 25, 2003.

Brewing apparatus typically include a prepackage set of ingredients (coffee, tea, etc.) that are placed in a brewing basket or bin which is a component of the brewing apparatus. The maker adds water to the brewing apparatus in a chamber that is designed to heat the water and cause the heated water to flow over the prepackaged ingredients. The process of preparing the brewed drink consists of 1. opening the brewing bin, 2. inserting a filter or a prepackaged mix, 2a. measuring the ingredients for the brew if not prepackaged, 3. adding a measured amount of water, 4. close the brewing bin, 5. place the carafe on the apparatus in a position to collect the brewed beverage, and turn on the brewing apparatus.

To accomplish this process many different designs of coffee makers have been proposed. All require the above process to make household type coffee. All of the prior art devices have an on board water tank, brew bin and require a filter. Filling the water tank has vulnerability for spillage. Filling the brew bin with coffee grounds allows the possibility to spill grounds outside the filter either on the counter, floor, or between the filter and the inner wall of the brew bin which introduces coffee grounds into the finished product.

Two ingredients water and coffee grounds influence the quality and consistency of a cup of coffee. Tap water is usually used for consumer coffee making. Tap water flavor varies depending on the treatment of the water and the region. Using the exact volume of water to a constant measurement of coffee is the only way to assure a consistent cup of coffee still vulnerable to the quality of the water and coffee.

Ground coffee is typically sold by the pound in resealable cans and bags. The can or bag of coffee is typically vacuum-sealed and after opening oxygen begins to affect the quality of the coffee grounds. The freshest cup of coffee produced is after the coffee container is first open and the quality deteriorates thereafter.

SUMMARY OF THE INVENTION

It is an object of the present invention to provide an improved beverage brewing apparatus and method.

In one aspect of the present invention, brew ingredients and water are pre-measured and sealed in a cartridge. In another aspect of the present invention, the water and brew ingredients are sealed in separate compartments of the cartridge. In yet another aspect of the present invention, a housing with a heating unit, expansion chamber and brewing chamber.

In still another aspect of the present invention, the brewing chamber has a shape complementary to at least a portion of the cartridge bottle. In yet still another aspect of the present invention, the cartridge has a cap or cover portion adapted to seat in the lower cavity of the housing. In a further aspect of the present invention, a valve assembly is installed in a lower portion of the housing to pierce the water compartment and control the flow of water over the heating unit.

In addition another aspect of the present invention, an expansion chamber in the beverage brewing apparatus positioned down stream of the heating apparatus for receiving heated water to allow for the steam expansion and control the flow of heated water to the down stream brew bin.

In a yet further aspect of the present invention, a second piercing element is positioned to pierce the brew ingredients compartment to permit the passage of heated water to flow from the expansion chamber to the brew ingredients compartment. In a still further aspect of the present invention, a third piercing element is positioned to pierce the brew ingredients chamber to direct the flow of a brewed beverage from the brew ingredients chamber to a drinking vessel. In a yet still further aspect of the present invention, the housing has either a manual or automatic switch to initiate the brewing process when the cartridge is firmly and properly installed on the housing.

In a yet further aspect of the invention the cartridge can be comprised of commercially available bottled water and a cap, to house brew ingredients or bottled water and a cap that houses the brew ingredients.

In a still further aspect of the present invention, a separate water cartridge and separate brew ingredients cartridge can be utilized to permit the user to combine any of the brew ingredients with any water cartridge or to heat water only.

In accordance with the object and aspects, the present invention:

Provides a prepackaged cartridge of water and brew ingredients,

Provides a housing in which to secure the prepackaged cartridge,

Provides a fresh brewed beverage.

Provides an expansion chamber to accommodate steam and hot water expansion.

DESCRIPTION OF THE EXEMPLARY EMBODIMENTS

Figure 1:
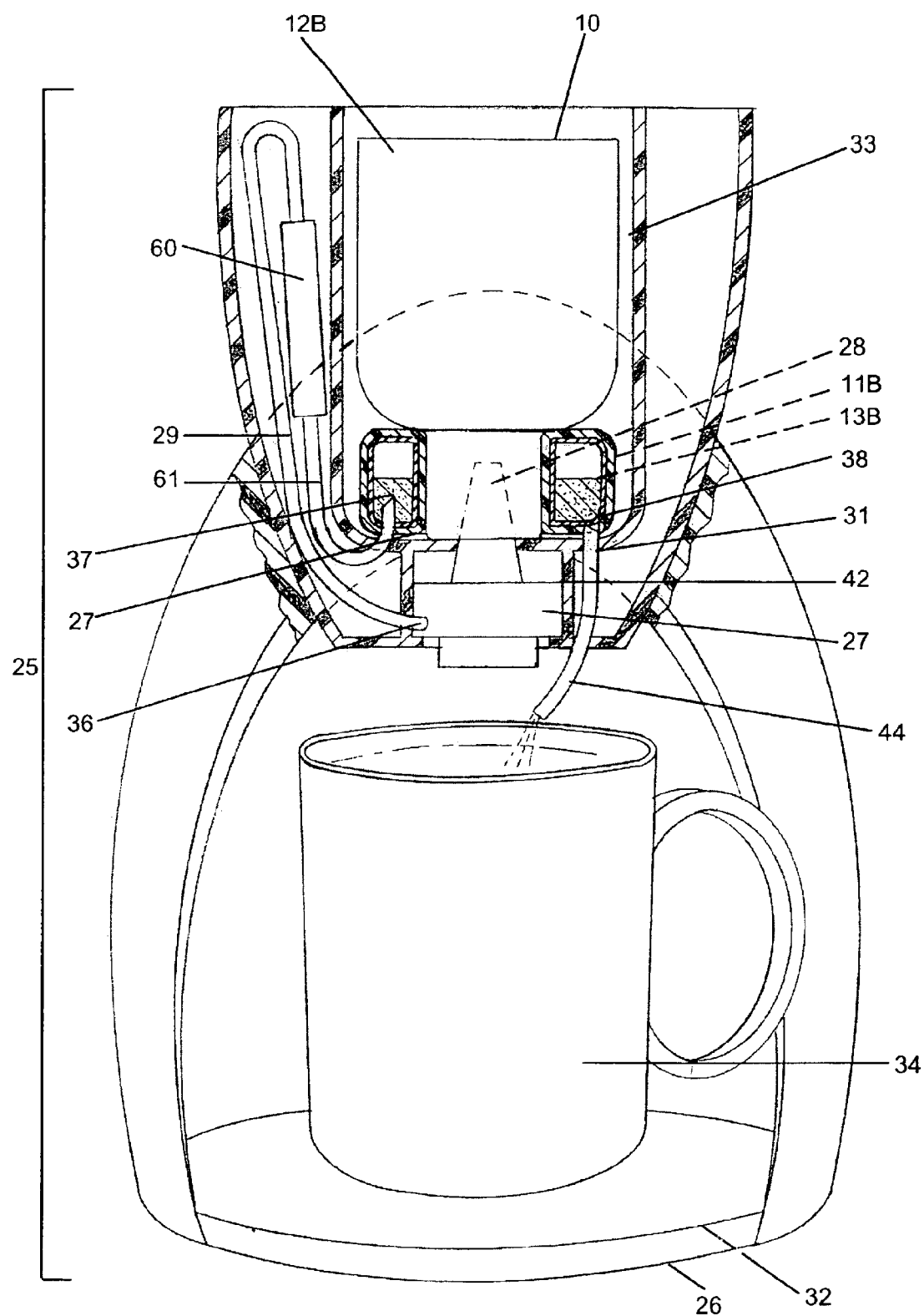
FIG. 1 Is a drawing of a cartridge seated in brewing apparatus with expansion chamber defining one embodiment of the present invention.
Figure 3:
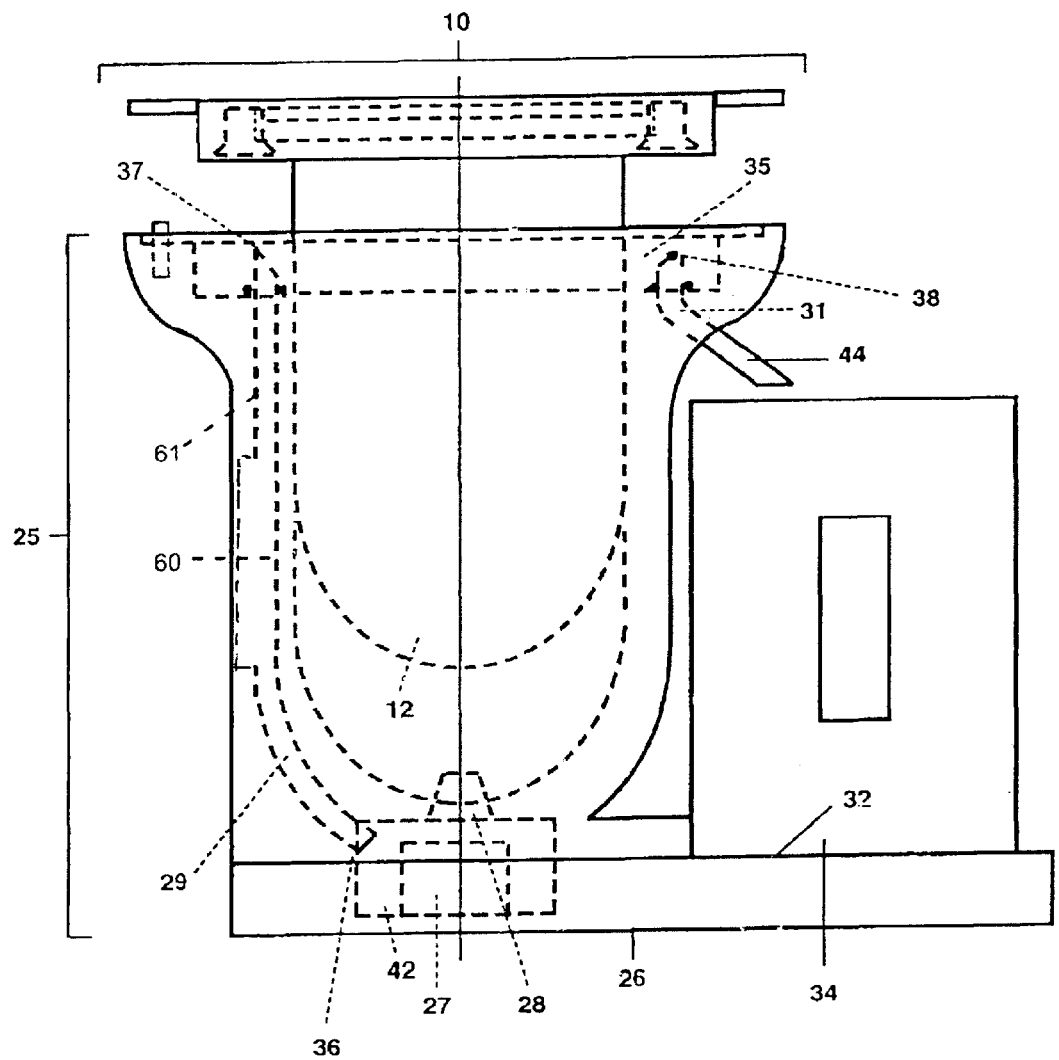
FIG. 3 Is a drawing of a brewing apparatus incorporating another embodiment of the present invention.

Referring to the drawings wherein like characters represent the same or corresponding components throughout the several views there is seen in FIGS 1, and 3 a disposable cartridge 10 having a cover portion 11 and a water chamber 12. A brew chamber 13 is formed in the cover portion 11 below the water chamber 12. The water chamber 12 is sealed from direct contact with the brew chamber 13. The water chamber 12 preferably contains filtered and/or purified water and for spring water if desired. The brew chamber 13 contains the ingredients for the beverage to be brewed, such as coffee grounds for example.

The cover portion 11B is toriodally shaped which comprises the brew bin 13 including brew ingredients and filter system to prevent non-liquid mater escaping through exit port 44.

A housing 25, shown in FIGS. 1, and 3 includes a base 26, an electronic heating element 27, a piercing valve 28, an a first passage or tube 29, an expansion chamber 60, a second passage tube 61, a third passage 31 which provides an exit or outlet port, and a vessel support 32 on which a vessel such as cup 34 is placed to receive the brewed beverage. The expansion chamber 60 accommodates fluid expansion which occurs due to the heated water. In some instances, the fluid may take the form of steam. The base 26 has a cavity 33 that is complementary in shape to the cartridge 10. The passage 31 also has a piercing end 38 extending into the lower part of the cavity 33. The passage 61 has a piercing end 38 extending into the lower part of cavity 33.

The passage 61 has an end 36 disposed adjacent the expansion chamber 60 adjacent to the passage 29 adjacent to the heating element 27 in a collecting and heating chamber 42. The passage 31 has an outer end 44 that extends over the vessel support 32 and the cup 34. With a screen or filter 23 are installed, the orientation of the cartridge 10 in the housing 25 is not critical. However, if the cartridge 10 is designed to be installed in a preferred position, the ears 17, 18 will have distinctive shapes to fit in respective recesses 47, 48. The cartridge 10, the cavity 33 and the upper receptacle 35 are substantially symmetrical about their respective longitudinal axes.

Figure 2:
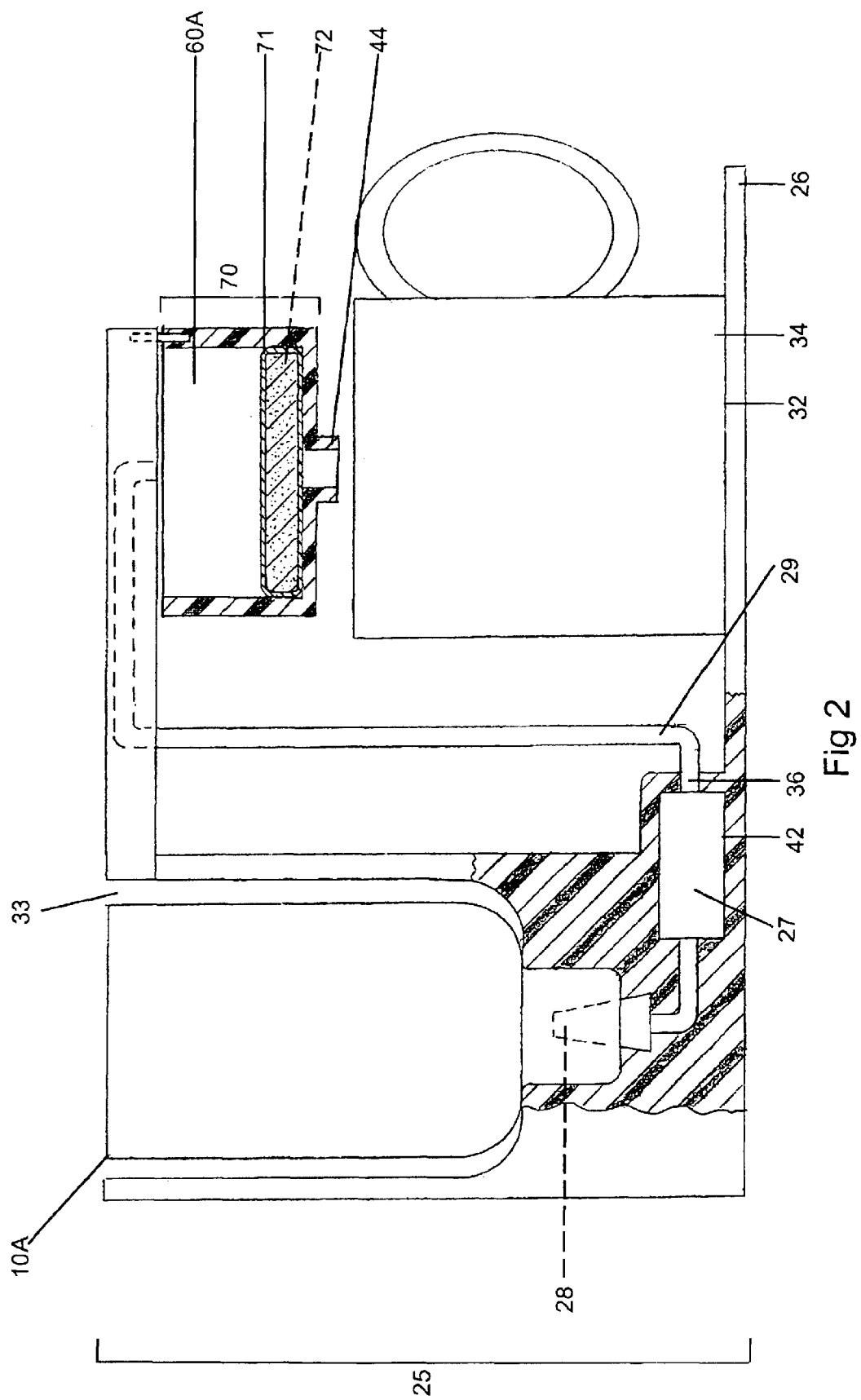
FIG. 2 Is a drawing of cartridge with water and brew ingredients separated in brewing apparatus defining another embodiment of the present invention.

With reference to FIG. 2, the base housing 26 is connected with an appropriate electrical connection in a conventional manner either automatic or manual. The cartridge 10A is inserted into the cavity 33. When the cartridge 10 is fully inserted, the piercing valve 28 will pierce the cartridge 10, The heater 27 will be energized and water from the water cartridge 10, will enter the heating chamber 42. The heated water will flow upward through the tube 29 and into the brew chamber 70. Where the beverage will be brewed as the water passes through the filter 71 and brew ingredients 72. An expansion area 60A formed immediately above the filter 71 accommodates hot water and steam expansion. The brewed liquid exits through exit port 73 and into the cup 34. When the heating chamber 42 is empty, the heating element 27 is de-energized by any conventional sensing circuit and the cup 34 can be removed from the support 32.

The conventional electronic circuitry, not shown, will illuminate a brewing indicator light and simultaneously activate the electronic water-heating unit 27. Water will exit the water cartridge 10A under the influence of the force of gravity and enter the water heater unit 27. The water will be heated and channeled up the tube 29 and into the brew chamber 70. The brew ingredients (i.e. coffee grounds) flavor the hot water. The brewed liquid passes through the other filter screen 71 to retain coffee grounds. Exits, through an exit or outlet port 44, into cup 34

The cartridge 10, 10A, and 10B is preferably formed of disposable material such as paper, cloth, plastics, or any material adapted for disposability and recycle ability. The embodiment described above is for the purpose of illustrating the invention, it should be understood that the form of the components can be different shapes and the overall size is relative to the amount of brewed beverage offered to be pre-packaged. If desired, the housing can be formed with multiple cavities and heating units to accommodate two or more cartridges at one time. While the cartridge 10, 10A, and 10B are shown as a cylindrical body with a hemispherical end, other shapes can be employed. The primary concern is that the cartridge 10, 10A, and 10B, and the cavity 33 have substantially complementary shapes or configurations. Thus both may be rectangular, trapezoidal or other geometric configuration. Also, while the preferred embodiment describes the cartridge 10, 10A, and 10B, as having both a water compartment and a brew chamber, these elements can be formed separately and combined to provide the cartridge 10, 10A, and 10B. This permits the user to combine any water container with any brew ingredients or to simply heat the water alone. By employing separate liquid and ingredients chambers, the user can have a flavored liquid that can be combined with any brew ingredients. For example, lemon flavored water can be combined with green tea to make lemon flavored tea, or apple cider can be combined with various spices to brew hot apple cider. The water container can also, for example, contain pure water, designer water, or distilled water.

What is claimed is:

1. A beverage brewer comprising:

a liquid source;

valve means for piercing and opening said liquid source;

heating means communicating with said valve means for heating the liquid;

passage means for delivering heated fluid from the heating means;

an expansion volume communicating with said passage means;

means for delivering said fluid from said expansion volume to a brew chamber; and means for delivering a brewed liquid from said brew chamber.

2. The beverage brewer defined in claim 1 further comprising: a two chamber disposable cartridge including said liquid source with brew bin immediately adjacent the an outlet of a liquid container of said disposable cartridge.

3. A beverage brewer comprising:

a valve means for piercing a volume of liquid;

a heating source communicating with a delivered liquid down stream of said valve means and delivering heated liquid to an expansion chamber; and a brew chamber downstream of said expansion chamber for receiving heated liquid there from, said brew chamber having outlet means for delivering a brewed substance.

4. A beverage brewer comprising:

a housing having a cavity formed therein and having a bottom, a piercing valve member disposed in said bottom of said cavity, a heating chamber in said housing adjacent said piercing valve member, a first inlet tube having a first end communicating with said heating chamber and a second end communicating with an expansion chamber, and the expansion chamber having a second end, and a second outlet tube having a first end and a second end; and a cartridge removably positioned in said cavity with water chamber and brew chamber, containing brew ingredients, extending sufficiently into said cavity to engage said piercing valve member, and said brew chamber engaging the cavity bottom to close said cavity, said second end of said expansion chamber, a first opening sealingly engaging said second end of said expansion chamber, a first passage means communicating between said first opening and said brew chamber to deliver heated liquid to said brew chamber, a second opening sealingly engaging said first end of said second outlet, and a second passage means communicating between said brew chamber and said second outlet to deliver a brewed substance from said brew chamber to said second outlet.

5. The beverage brewer defined in claim 4 further comprising: said expansion chamber having means to accommodate excessive fluid pressure.

* * * * *